Patented Nov. 11, 1952

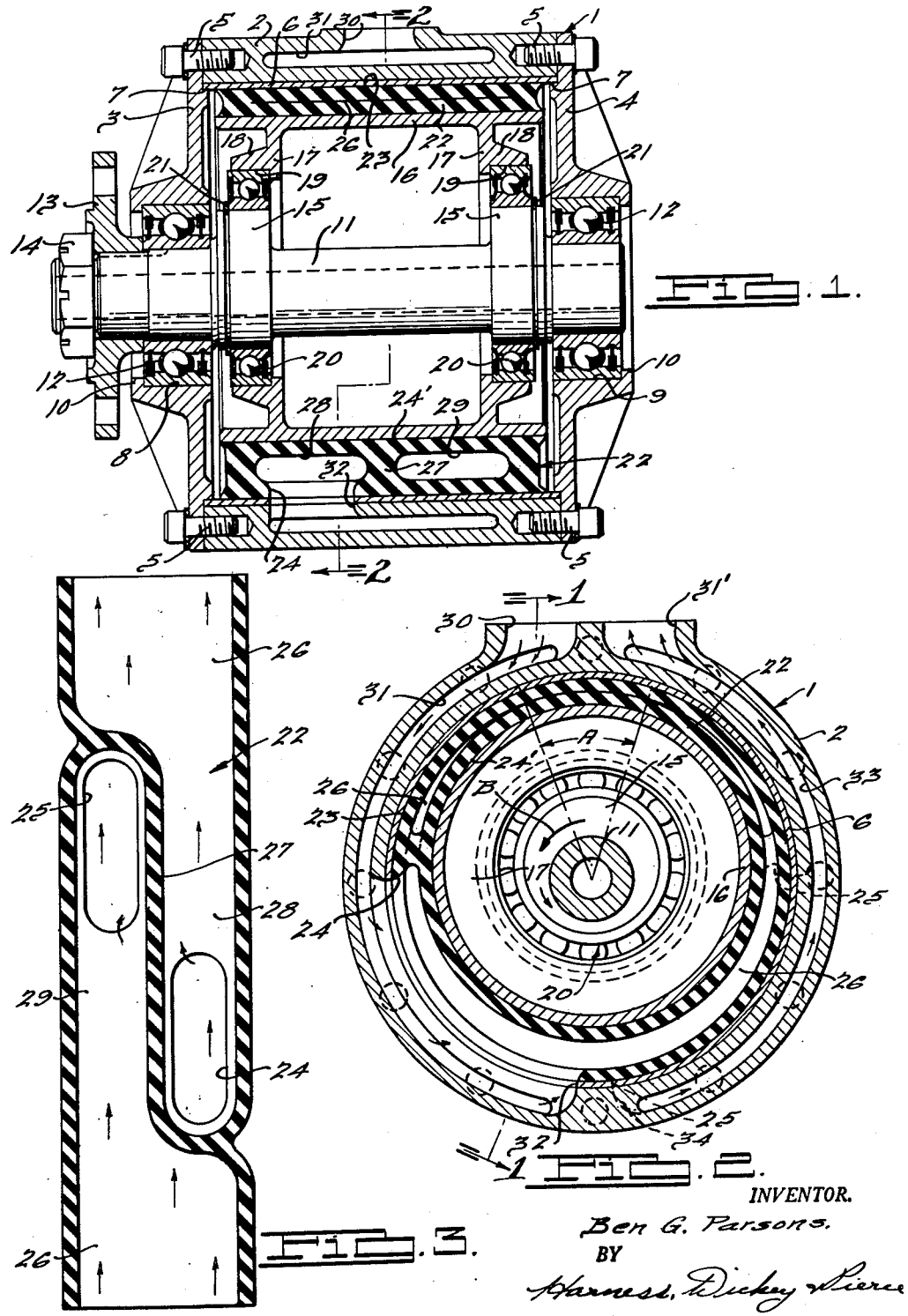

2,617,362

UNITED STATES PATENT OFFICE 2,617,362

FLUID MOTOR OR PUMP WITH COLLAPSIBLE CHAMBER

Ben G. Parsons, Grosse Pointe, Mich.

Application September 2, 1948, Serial No. 47,375

1 Claim. (Cl. 103—149)

The present invention relates to improvements in fluid displacement means, and particularly fluid motors or pumps.

One of the primary objects of the present invention is to provide improvements in fluid motors or pumps in which a sealed unit is employed which has no leakage, so that it is particularly adapted for use in a hydrostatic drive system.

A further object of the invention is to provide a novel fluid displacement means for a fluid motor or pump.

Another object of the invention is to provide a construction by which the heat produced is comparatively reduced by smooth flow over and around curved paths.

Other objects of the invention will become apparent from the following specification, the drawing relating thereto, and from the claim hereinafter set forth.

In the drawing, in which like numerals are used to designate like parts in the several views throughout:

Figure 1 is a cross sectional view of a fluid motor embodying features of the present invention and taken substantially along the line 1—1 of Fig. 2;

Fig. 2 is a cross sectional view taken substantially along the line 2—2 of Fig. 1; and Fig. 3 is a developed view on a larger scale in cross section of the fluid displacement means of the present invention.

Referring to the drawing, a fluid motor is illustrated which comprises a housing, generally indicated at 1. The housing includes an annular member 2 having end wall members 3 and 4 secured thereto by bolts 5. The bolts 5 are located at specified points therearound, and are received through openings in the end wall member and aligned tapped openings in the adjacent faces of member 2. The housing also includes an annular liner 6 which is disposed on the inside of member 2, and which is engaged by annular shoulders 7 formed on end wall members 3 and 4.

Aligned shaft openings 8 and 9 are formed in the wall members 3 and 4, respectively, and each of such member has an inturned flange 10 formed thereon.

A shaft 11 is disposed within the housing member with the opposite ends thereof mounted within openings 8 and 9 by means of sealed antifriction bearing assemblies indicated at 12. One such sealed bearing unit is known in the trade under the trade name "Plya-Seal." The sealed units comprise inner and outer races having caged balls interposed therebetween and having sealing means disposed between the inner and outer races on opposite sides of the balls. The unit is charged with a lubricant which is retained therein.

The outer races of the units 12 are mounted within the openings 8 and 9 against shoulders 10 and the inner races embrace the adjacent parts of shaft 11 within openings 8 and 9. One end of shaft 11 has a drive flange 13 keyed thereon and secured thereto by means of a lock nut 14. The drive flange 13 is optional and other drive means may be connected to the shaft 11 for connection with the part to be driven by the motor.

The shaft 11 is concentric with the sleeve 6 in the housing member 2. A pair of eccentric cams 15 are formed integral with the shaft 11 at longitudinally spaced locations. The eccentric cams 15 have circular peripheries, and the extent or degree of the eccentricity determines the stroke of the piston which will be more apparent after the following discussion.

An annular piston 16 is disposed within the housing, the outer surface of such piston being cylindrical in form. The piston 16 has inwardly directed annular flanges 17 formed integral therewith, and such flanges 17 have annular, axially extended flanges 18 thereon. The flanges 18 have annular bearing seats 19 which overlie and surround the eccentric cams 15 in spaced relation thereto.

The piston 16 is connected to the eccentric cams 15 for relative rotative movement therebetween by means of sealed bearing assemblies, generally indicated at 20. The sealed bearing assemblies 20 are similar in type to the bearing assemblies 12, and include inner and outer races having caged balls interposed therebetween with seals disposed between the inner and outer races. The outer races of assemblies 20 bear against face 19 and the adjacent annular shoulder on the flange 17; and the inner races engage and embrace the peripheral surfaces of their adjacent cams 15. Snap rings 21 are received within grooves in the outer ends of rollers 15 and bear against the adjacent outer faces of the inner bearing races.

The peripheral surface of the piston 16 is spaced from the inner face of the housing sleeve 6 and an expansible and contractible fluid displacement member 22 is disposed therebetween. The member 22 is resilient and is formed of synthetic rubber but may be formed of other suitable material. It is generally annular in shape having an outer annular surface, indicated at 23, and an inner annular surface, indicated at 24'. The outer surface 23 is vulcanized or bonded to the adjacent face of the liner member 6; and the inner face 24' is vulcanized to the adjacent peripheral surface of the piston 16. The piston 16 and the member 22 are thus fixed against rotation with respect to the housing members 6 and 2 and since the member 22 is supported on opposite sides it is relieved of pressure load. The piston 16 is moved radially with respect to the housing upon expansion and contraction of the resilient member 22.

The member 22 is formed with a continuous fluid passageway therein, an inlet port 24 communicating with the inlet end of the passageway, and an outlet port 25 communicating with the opposite end of the passageway. The main fluid passageway is indicated at 26, and it is transversely divided by means of a wall 27 in that portion adjacent the inlet port 24 and the outlet port 25. Passageways 28 and 29, which are in open communication with the main passageway 26, are thus provided in the displacement member adjacent the inlet port 24 and the outlet port 25, respectively.

The motor housing member 2 is formed with a fluid inlet port 30 and an outlet port 31'. The inlet port 30 communicates through a cored passage 31 and an inlet opening 32 formed through the inner wall thereof and through the member 6 and coextensive with the inlet port 24.

The outlet port 31' communicates through a cored passage 33 with an outlet opening 34 formed in the inner wall thereof and through the housing member 6 which is coextensive and aligned with the outlet port 25.

The fluid circuit thus follows a route defined by opening 30, passageway 31, through opening 32, past port 24, and into passageway portions 28, 26 and 29, then through outlet port 25 through opening 34 into the cored passage 33, and returned through the outlet 31'. The direction of flow is indicated by the arrows in Fig. 2. The outlet 25 is greater than 360° around from the inlet 24 so that there will be no dead-center position.

When operating as a motor, fluid under pressure from a suitable source is introduced into inlet port 30, passes through port 24 and into passage 26. Due to the eccentricity of the rollers 25, one part of the piston 16 is moved radially toward the adjacent face of housing member 6 and the resilient member 22 is compressed to the point that a portion of the passageway 26 is closed off, sealing one side of the passageway from the other. As viewed in Fig. 2, the passageway has been closed on an arc indicated at A, the center part thereof being closed the tightest. It is important to note that the circumferential lengths of ports 24 and 25 are controlled by the arc of contact; that is, the length of arc A. The circumferential lengths of ports 24 and 25 are larger than the arc so that there will be no dead spots. The length of the arc and the sealed portion of the passageway will be determined by the extent or degree of eccentricity of rollers 15.

For the position shown in Fig. 2, the part of the passageway 26 clockwise around the passageway toward the inlet 24 is the high pressure side of the displacement member 22; and that portion of the passageway 26 counterclockwise around from the point of contact of the arc toward the outlet passageway is the low pressure side. The reaction of the fluid pressure within the high pressure side of the passageway causes a reaction force against the periphery of the piston 16 which causes a radially inward movement thereof. Such radially inward movement in turn causes a reaction against the roller 15, causing it to rotate in the direction of arrow B in Fig. 2. As the roller 15 rotates in the direction of the arrow, the sealing arc A correspondingly moves around the member 22 in the same direction, causing the point of sealing to be progressively moved around the passageway 26. The fluid in the low pressure side of the passageway is moved through the outlet port 25, and returns through the outlet 31. Continued application of fluid under pressure to the passageway 26 through inlet port 25 thereby causes continuous rotation of rollers 15 and, therefore, continuous rotation of shaft 11. A member, such as a wheel, connected to the shaft 11 through the drive flange 13 will be driven by the motor as the shaft 11 turns.

It is pointed out that all of the corners in the inlet and outlet ports and in the intercommunicating passageways are rounded, as shown in Figs. 1 and 2, so that there is smooth flow around and over these curved paths, and the heat and cavitation produced is comparatively reduced.

It will also be pointed out that the unit here provided is completely sealed, the passageway 26 and the moving passageways providing a continuous circuit for the fluid so that the unit has no leakage, and it is particularly adapted for use as a motor in a hydrostatic drive system.

Formal changes may be made in the specific embodiment of the invention described without departing from the spirit and substance of the invention, the scope of which is commensurate with the appended claim.

What is claimed is:

A fluid device comprising a housing having an annular inner surface and end wall members, a shaft extending within said housing and concentric with said annular surface, means mounting said shaft for rotation with respect to said end wall members, eccentric means on said shaft within said housing, an annular shaped piston within said housing radially spaced from the inner surface of said housing and surrounding said eccentric means, means interconnecting said eccentric means and said annular piston to permit relative rotation therebetween, an annular and tubular expansible and contractible member disposed within said housing having the outer side fixed to said inner surface and having the inner side fixed to said annular piston, means forming a continuous fluid passage through said expansible and contractible member, facing portions of said fluid passage being progressively forced into an arc of contact upon rotation of said shaft, means forming an inlet port communicating with said passage, and means forming an outlet port communicating with said passage, said inlet and outlet ports having greater circumferential lengths than the arc of contact of said fluid passage.

BEN G. PARSONS.

REFERENCES CITED

The following references are of record in the file of this patent:

UNITED STATES PATENTS

| Number | Name | Date |
|---|---|---|
| 2,332,157 | Mapson | Oct. 19, 1943 |
| 2,403,572 | Wittenberg | July 9, 1946 |
| 2,404,890 | Schlumbohn | July 30, 1946 |
| 2,414,355 | Bogoslowsky | Jan. 14, 1947 |
| 2,428,619 | Douglas | Oct. 7, 1947 |

FOREIGN PATENTS

| Number | Country | Date |
|---|---|---|
| 484,479 | Great Britain | May 2, 1938 |